(12) United States Patent
Dunn, Jr. et al.

(10) Patent No.: US 11,104,308 B1
(45) Date of Patent: Aug. 31, 2021

(54) SEMI-TRAILER

(71) Applicant: Glen J. Dunn & Associates, Ltd., Chicago, IL (US)

(72) Inventors: Glen J. Dunn, Jr., Chicago, IL (US); Dariusz J. Las, Burbank, IL (US)

(73) Assignee: Glen J. Dunn & Associates, Ltd., Chicago, IL (US)

( * ) Notice: Subject to any disclaimer, the term of this patent is extended or adjusted under 35 U.S.C. 154(b) by 0 days.

(21) Appl. No.: 16/846,923

(22) Filed: Apr. 13, 2020

(51) Int. Cl.
*B60S 9/10* (2006.01)
*B62D 53/06* (2006.01)

(52) U.S. Cl.
CPC .............. *B60S 9/10* (2013.01); *B62D 53/068* (2013.01)

(58) Field of Classification Search
CPC .... B62D 25/2054; B62D 33/03; B62D 21/12; B62D 21/14; B62D 33/0207; B62D 33/042
USPC ... 410/121, 94, 129, 143, 122, 150, 155, 89, 410/106, 117, 120, 96, 87, 49, 4, 39
See application file for complete search history.

(56) References Cited

U.S. PATENT DOCUMENTS

| | | | | |
|---|---|---|---|---|
| 3,181,887 A | * | 5/1965 | Boylan | B60D 1/62 280/421 |
| 3,292,803 A | | 12/1966 | Keller et al. | |
| 3,347,563 A | * | 10/1967 | Harbers | B62D 53/0864 280/425.1 |
| 3,628,811 A | * | 12/1971 | Rivers | B60D 1/26 280/421 |
| 3,781,035 A | * | 12/1973 | Petersson | B60S 9/02 280/764.1 |
| 4,030,171 A | * | 6/1977 | Arguin | B60P 1/6418 280/408 |
| 4,342,264 A | * | 8/1982 | Hindin | B60F 1/043 105/215.2 |
| 5,060,964 A | * | 10/1991 | Vick | B62D 53/125 280/421 |
| 7,854,443 B2 | * | 12/2010 | Alguera | B62D 53/125 280/421 |
| 8,382,145 B2 | * | 2/2013 | Alguera Gallego | B60T 13/265 280/421 |
| 2010/0032923 A1 | * | 2/2010 | Feldhaus | B60S 9/215 280/426 |
| 2011/0127749 A1 | * | 6/2011 | Alguera Gallego | B60T 13/265 280/421 |
| 2017/0349189 A1 | * | 12/2017 | Nakao | B61F 5/52 |
| 2019/0009799 A1 | * | 1/2019 | Taga | B61F 5/302 |

* cited by examiner

*Primary Examiner* — D Glenn Dayoan
*Assistant Examiner* — Sunsurraye Westbrook
(74) *Attorney, Agent, or Firm* — Leydig, Voit & Mayer, Ltd.

(57) ABSTRACT

A semi-trailer including an elongated trailer frame having a front portion and a rear portion, a wheel bogie disposed beneath the trailer frame, a jack disposed proximal the rear portion of the trailer frame, where the jack is configured to raise and lower the rear portion of the trailer frame, The jack includes an actuator connected to the trailer frame at the rear portion, a plurality of pivotal support arms connected to an end of the actuator and a plurality of ground engaging members connected to the end of the plurality of support arms, where the ground engaging members are powered to transversely move the rear portion of the trailer frame.

19 Claims, 7 Drawing Sheets

SEMI-TRAILER

BACKGROUND OF THE INVENTION

In conventional semi-trailers, jack devices are used close to an end of the trailer that attaches to a truck or tractor to lift the trailer when it is not connected to the tractor. These trailers are usually hand operated by a crank, which operates to lift or lower a stand or legs that support a free end of the semi-trailer. During use, a typical trailer is connected via kingpin connection at its free end with a mating socket on a tractor. In this use condition, the legs of the trailer jack are typically retracted and the trailer moves and maneuvers by motion and maneuver of the tractor.

When positioning the trailer in alignment with a dock for loading or unloading, the tractor will typically perform tight maneuvers to manipulate the position of a wheeled end of the trailer in alignment with the dock. Depending on the space available in front of the dock for maneuvering, the task of positioning the wheeled end of the trainer relative to the dock may require many tight or closed in maneuvers. Given that the position of the trailer is dictated by the positioning of its kingpin end, the maneuvers that are often carried out tend to cause undue stress on the wheels, tires and axles of the trailer's wheeled end, as well as the overall structure of the trailer itself.

Various solutions have been proposed in the past to help alleviate the need to manipulate trailer position by use of the tractor alone. One example of a previously proposed solution can be seen in U.S. Pat. No. 3,292,803 by Keller et al. In Keller, the trainer jack opposite the wheeled end of the trailer chassis includes hydraulic actuators, which can replace the traditional hand-crank actuator, for raising and lowering the jack stands. Keller's trailer further includes doors on the front side of the trailer (opposite the wheels) such that, when the trailer is disconnected from the tractor, the front may be lowered using the hydraulic actuators to enable loading of the trailer from the front. While Keller's solution, in some respects, alleviates the stress caused while aligning the rear of the trailer with a dock, by enabling loading of the trailer in any location from the ground, it does not provide a viable solution for industrial loading operations of docked trailers, and also does not facilitate trailer maneuvering while the trailer is connected to a tractor.

BRIEF SUMMARY OF THE INVENTION

The invention provides a semi-trailer including an elongated trailer frame having a front portion and a rear portion, a wheel bogie disposed beneath the elongated trailer frame, where the wheel bogie includes a plurality of wheels having corresponding axles, and a jack disposed proximal the rear portion of the elongated trailer frame. The jack is configured to raise and lower the rear portion of the elongated trailer frame. The semi-trailer also includes a jack frame disposed proximal the axles of the wheel bogie and configured to abut and lift the axles when the jack is engaged; an actuator having a distal end and a proximal end opposite the distal end, where the proximal end is connected to the elongated trailer frame at the rear portion; a plurality of pivotal support arms having a distal end and a proximal end opposite the distal end, where the proximal end is connected to the distal end of the actuator; and a plurality of ground engaging members connected to the distal end of the plurality of support arms. The ground engaging members are configured for rotational movement.

The invention also provides a semi-trailer including an elongated trailer frame having a front portion and a rear portion; a wheel bogie disposed beneath the elongated trailer frame, where the wheel bogie includes a plurality of wheels having corresponding axles; and a jack disposed proximal the rear portion of the elongated trailer frame. The jack is configured to raise and lower the rear portion of the elongated trailer frame. The semi-trailer also includes an actuator having a distal end and a proximal end opposite the distal end, where the proximal end is connected to the elongated trailer frame at the rear portion; and a plurality of pivotal support arms having a distal end and a proximal end opposite the distal end. The proximal end is connected to the distal end of the actuator. The semi-trailer further includes a plurality of ground engaging members connected to the distal end of the plurality of support arms. The ground engaging members are configured for rotational movement.

The invention further provides a method for operating a semi-trailer, which includes providing a frame having a front portion and a rear portion, the frame including a longitudinal axis, the front portion including a kingpin connection adapted for mating engagement with a socket disposed on a tractor, the rear portion including a wheel bogie having a plurality of wheels connected via respective axles and providing a jack associated with the wheel bogie. The method also includes selectively activating the jack to move from a retracted position to an extended position to raise the wheel bogie off a ground surface to a height such that a gap is formed between the plurality of wheels and the ground surface and the jack bears a load of the semi-trailer and selectively activating the jack to move from the extended position to the retracted position to lower the wheel bogie back down to the ground surface such that the plurality of wheels contacts the ground surface to bear the load of the semi-trailer. The method further includes selectively activating one or more moveable ground engaging members of the jack while the jack is in the extended position to move the wheel bogie and the rear portion of the frame in a direction that is perpendicular to the longitudinal axis.

BRIEF DESCRIPTION OF THE SEVERAL VIEWS OF THE DRAWING(S)

DETAILED DESCRIPTION OF THE DRAWINGS

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
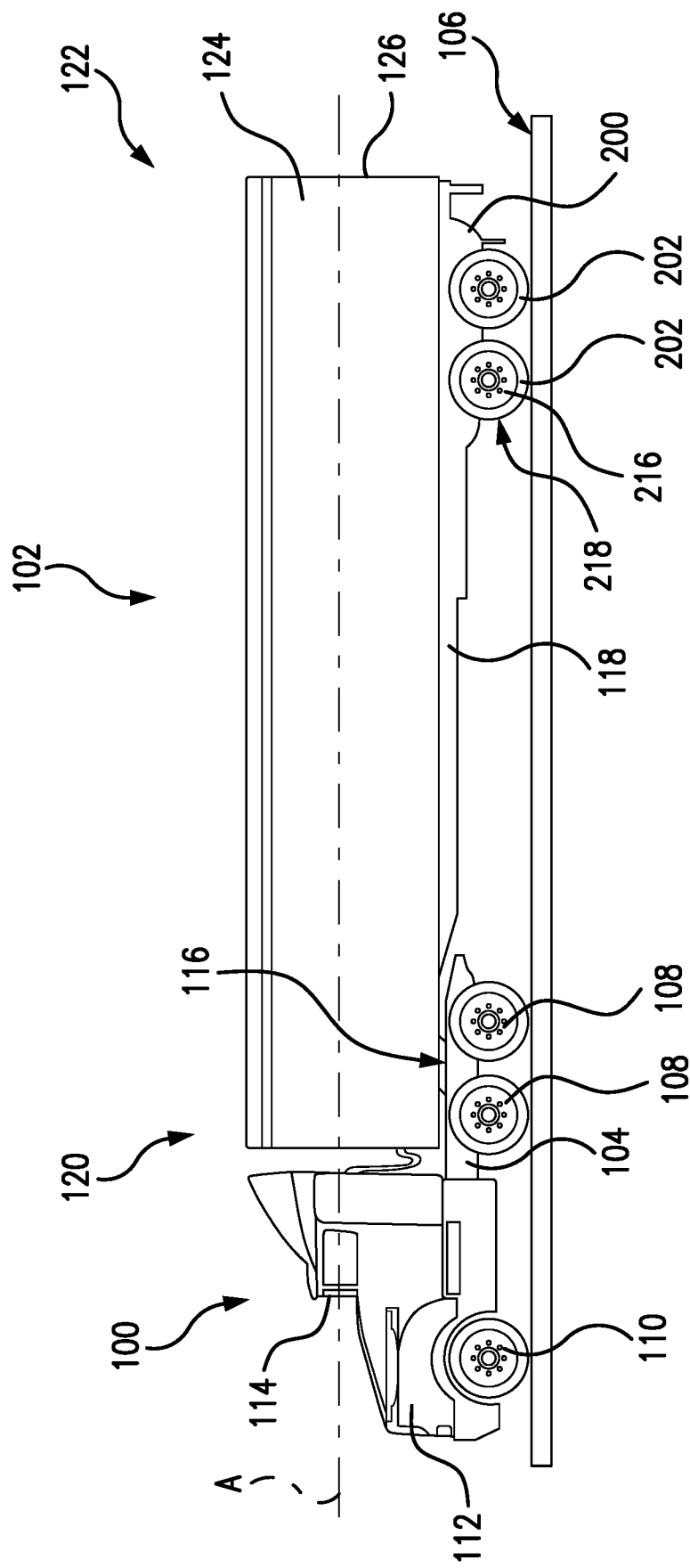
FIG. 1 is an outline view from a side perspective of a tractor trailer in accordance with the disclosure.

Referring now to FIG. 1, an outline view of a tractor 100 having a semi-trailer 102 connected thereto is shown from a side perspective. The tractor 100 includes a frame 104 that is supported and moveable relative to a road surface 106 by one or more rear wheel sets 108 and a set of front, steerable wheels 110. In the known fashion, power to drive the wheels 108 is provided by an engine 112 and operation of the truck is carried out autonomously or by an operator occupying an operator cab 114. A kingpin connection 116 pivotally connects the tractor frame 104 with a semi-trailer frame 118. The semi-trailer frame 118 includes a front portion 120 that is connected to the tractor 100 at the kingpin connection 116, and a rear portion 122. A semi-trailer bogie 200 is connected to the rear portion 122 of the semi-trailer frame 118 and includes one or more wheel sets 202 that support the rear portion of the semi-trailer 102 on the road surface 106 during travel. As is known, and in further reference to FIG. 2, each of the wheel sets 202 may include two or more single or tandem tires having air-brakes and being supported on axles 204. In the embodiment shown, the semi-trailer 102 includes a box enclosure 124 that is accessible by doors 126, but other configurations can be used. Known configurations of semi-trailers can take on various shapes and structures depending on their application, including flatbed trailers, tanker trailers, loose aggregate bucket trailers, and special-use trailers. Relevant to the present disclosure, the systems and methods described herein are applicable to any type of trailer that includes at least one semi-trailer or self-supported "fifth wheel" trailer that includes a frame supported on a road surface by two or more wheels.

Figure 2:
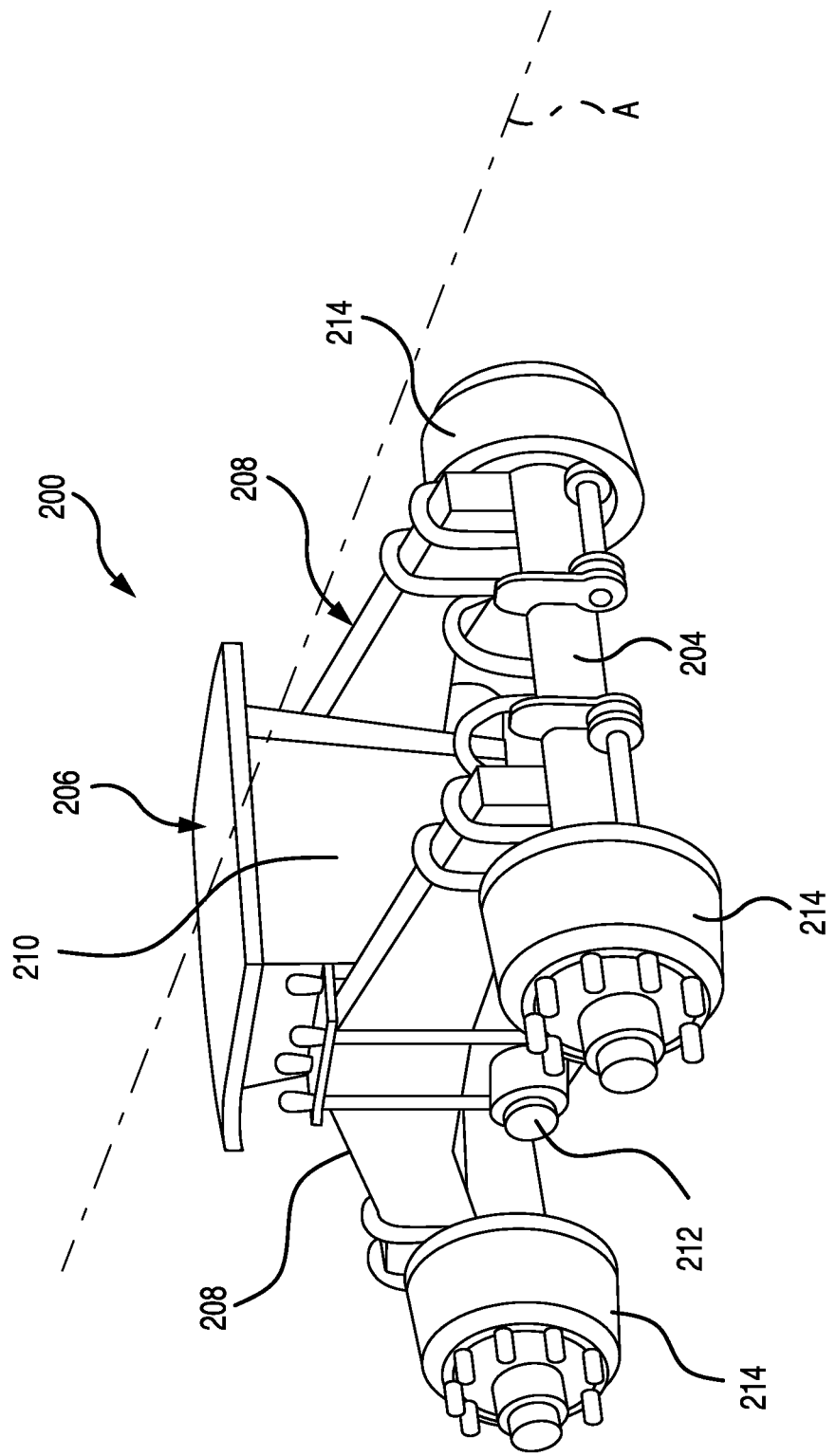
FIG. 2 is an outline view of a semi-trailer bogie with the wheels removed to illustrate the main components thereof in accordance with the disclosure.

As shown in FIG. 2, the semi-trailer bogie 200 includes a mounting flange 206 that can be rigidly or slidably connected to a bottom-surface of the semi-trailer frame 118 (FIG. 1). The bogie 200 includes two axles 204, although one or more than two axles may also be used in some known bogie configurations. Suspension arrangements 208 connect the axles 204 to a body 210 of the bogie, and a swivel bar 212 permits the axles 204 to swing fore and aft relative to the body 210, as is known. It is noted that, while leaf-spring suspension arrangements are shown, air-cushion, pneumatic and/or other suspension arrangements may also be used. In the embodiment shown, each axle 204 includes wheel hubs 214 at either end onto which wheel rims 216 and tires 218 (shown in FIG. 1) are mounted. The hubs may further include drum brakes for each wheel hub, in the known arrangement.

Figure 3:
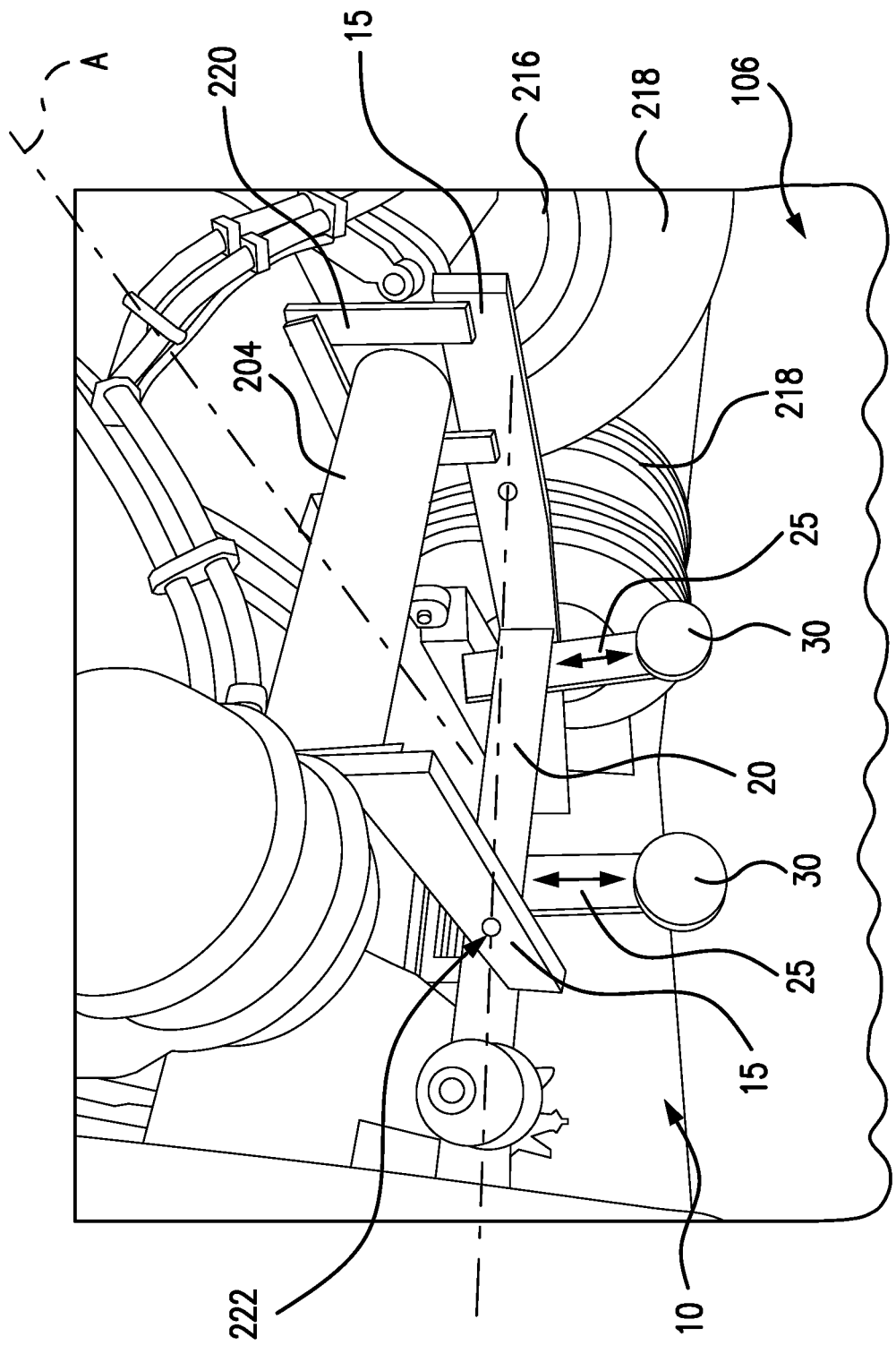
FIG. 3 is a perspective view of a jack deployed beneath a semi-trailer bogie in accordance with the disclosure.

In accordance with the present disclosure, a jack is connected to the axles 204 of the semi-trailer bogie, as shown in the outline view from a bottom perspective shown in FIG. 3. In this figure, and in the illustrations that follow, structures and features that are the same or similar to corresponding structures and features already described are denoted by the same reference numerals previously used for simplicity. In reference now to FIG. 3, a jack 10 is shown connected to the axles 204 and deployed beneath the rear portion 122 of the semi-trailer 102 according to an embodiment of the disclosure. The jack 10 is a device that is integrated or attachable to the semi-trailer 102 and, specifically, to the semi-trailer bogie 200. Stated differently, the main function of the jack 10, as described hereinafter, may be provided as an addition or kit for mounting onto an existing bogie, or may alternatively be provided by the original equipment manufacturer (OEM) for the bogie.

In the embodiment shown, the jack 10 is an add-on to an existing bogie 200. The jack 10 essentially includes a frame 15, an actuator 20, a plurality of support arms 25, and a plurality of ground engaging members 30, which in the illustrated embodiment can be realized as wheels or rollers configured to laterally displace along the ground, or feet, which are stationary. In further reference to FIG. 7, in some embodiments, each of the plurality of ground engaging members 30, embodied as wheels or rollers such as forklift, solid rubber wheels, includes an axle 40 connected to a motor 45 to rotate the respective ground engaging member 30 when the member 30 is in contact with the ground. In certain embodiments, the motor 45 may be connected to a power and control conduit 50 for operational control. The conduit 50 may carry electrical power, mechanical motion, and/or pneumatic or hydraulic actuating fluid, depending on the type of power required to operate the motor 45 selectively in either direction.

Returning now to the illustration shown in FIG. 3, the frame 15, which is embodied as two cross-bars extending in parallel along the fore-aft or longitudinal axis, A, of the semi-trailer 102, is attached to the semi-trailer bogie 200 and, specifically, to the axles 204 using clamps 220, but it should be appreciated that other methods for attachment such as welded and/or bolted flanges can also be used. Attachment of the frame 15 attaches to the axles 204 accomplishes the ability to support the axles and, therefore, the rear end of the trailer, on the jack 10. An actuator 20, which in the illustrated embodiment is a pneumatic actuator, but other types of actuation force may be used, operates to raise and lower one or more supports arms 25, each having a ground engaging member 30. In the embodiment shown, the actuator 20 is supported on the frame 15 and includes actuating devices that operate to extend or retract the arms 25 and members 30 vertically away and towards the ground in a perpendicular direction, L, relative to the longitudinal axis A. Further, when the arms 25 are in a retracted position, the actuator 20 may further pivot about a pivot axis 222 to fully retract the arms 25 and provide ground clearance in the space between the wheels 218.

In one embodiment, which can be described as a simple jack, the ground engaging members 30 are feet or landing pads that distribute the weight of the semi-trailer 102 evenly on the ground when extended. In certain embodiments, the ground engaging members 30 are powered wheels, which are sized to support the weight of the rear portion 122 of the semi-trailer 102 when the support arms 25 are lowered or extended. In some embodiments, the wheels at 30 are also configured for powered translational motion by a motor 45, for example, by electric, hydraulic or pneumatic power, to move the rear of the semi-trailer 102 in a direction transverse to the length of the trailer frame 118. Rotation of the ground wheels 30 causes the rear end 122 of the semi-trailer 102 to move in a direction that is parallel to the axles 204 such that the trailer 102 rotates about its kingpin connection to the tractor when the tractor is stationary.

Figure 4:
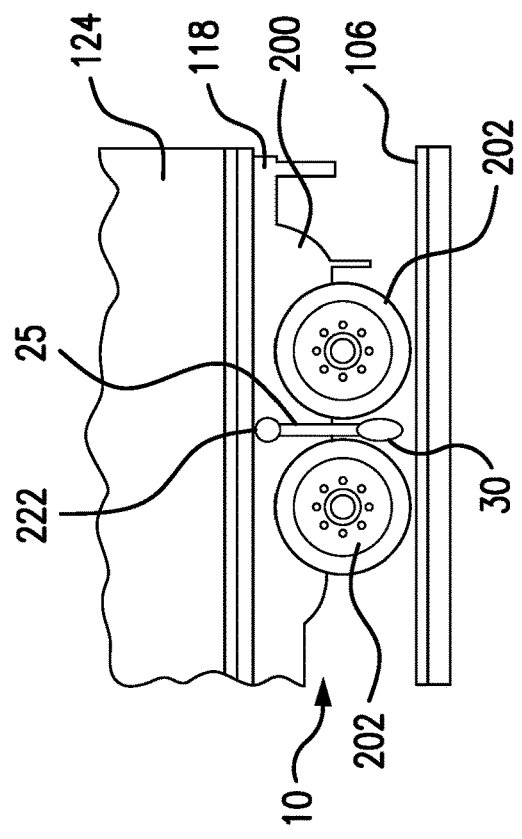
FIGS. 4, 5 and 6 are partial outline views of various operating positions of a jack for use with a semi-trailer in accordance with the disclosure.
Figure 5:
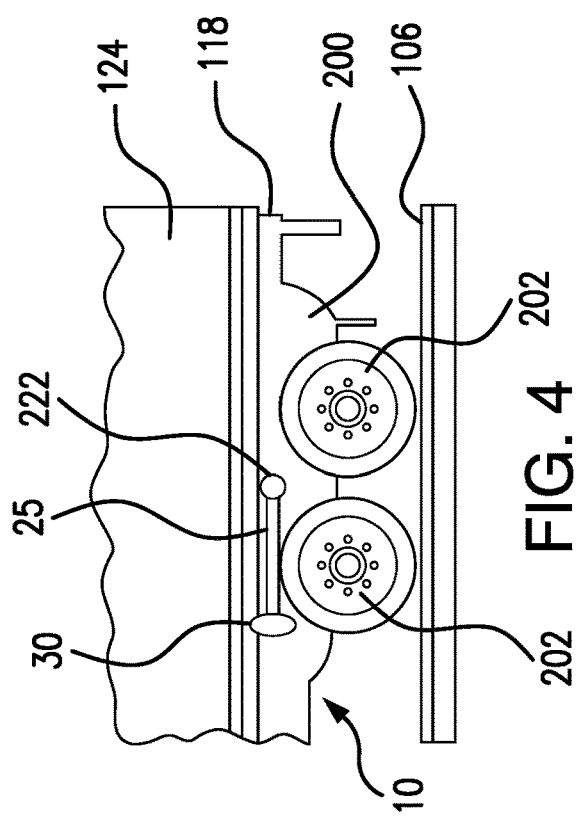
Figure 6:
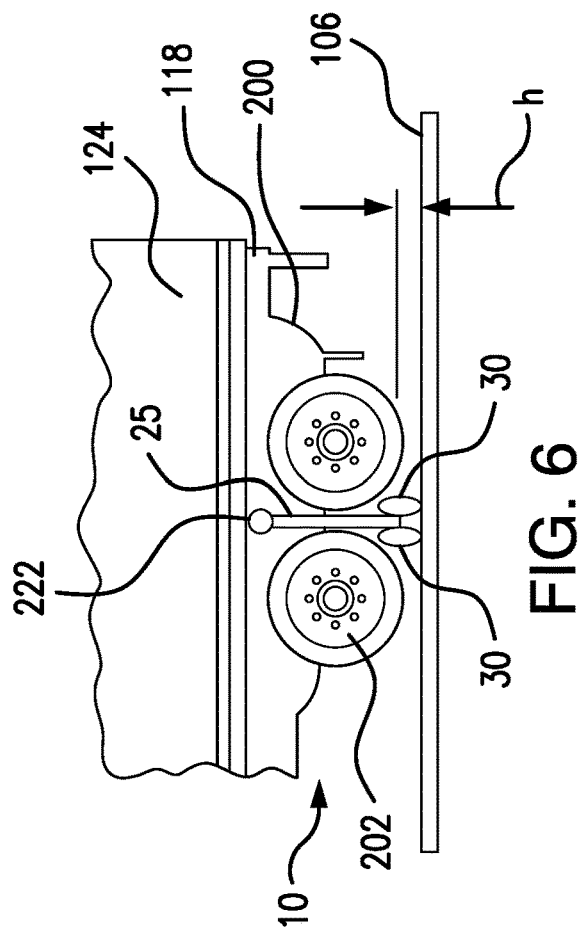

During operation, the jack 10 may generally take various positions, certain of which are shown in FIGS. 4, 5 and 6. In FIG. 4, the jack 10 is shown in a stowed position that can be used, for example, when the semi-trailer 102 is travelling on the road at high speeds during normal use. In this stowed position, the actuator 20 is rotated about axis 222 such that the arms 25 are rotated upwards (in a fore or aft direction) to lift the members 30 away from the ground or road surface 106. The arms 25 are preferably in their retracted position during this operation.

When the semi-trailer 102 is stopped or stationary, and there is a desire to deploy the jack 10, the actuator 20 is rotated about axis 222 in a direction opposite the direction in which it was rotated to assume the stowed position, such that the arms 25 are rotated downwards to assume a generally vertical orientation (as also shown in FIG. 3). In this deployed position, as shown in FIG. 5, the arms 25 remain retracted such that the ground engaging members 30 are either clear of or just touching the ground surface 106 but without carrying any weight of the semi-trailer 102. In the deployed condition, the wheels 202 still carry the load of the weight of the trailer.

When use of the jack is desired, for example, to provide ground clearance between the trailer wheels 202 and the ground for changing a tire, or for maneuvering the rear portion of the trailer, the arms 25 are extended and begin to push the ground engaging members 30 towards and against the ground. The arms 25 may extend sufficiently to lift the wheels 202 from the ground and provide a lift clearance, h, between the wheels and the ground, as shown in FIG. 6. In this, extended position, the weight of the trailer that was borne by the wheels has now transferred to the ground engaging members 30. Following use, the jack 10 may be again stowed by first retracting the arms 25 to lift the ground engaging members from the ground, and then rotating the actuator 20 to swing the arms 25 and ground engaging members 30 closer to the frame 118. It should be appreciated that, depending on the linear travel of the arms 25, the function of rotating the arms for stowage may be omitted when the retracted arms provide sufficient ground clearance between the road surface and ground engaging members.

Figure 7:
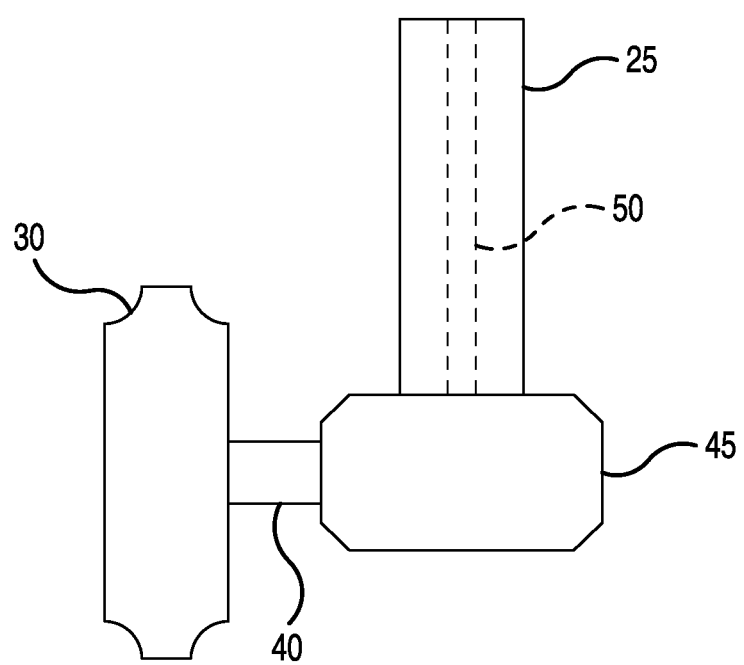
FIG. 7 is a diagrammatic view of a movable ground engaging member of the jack of FIG. 3 according to an embodiment of the disclosure.

In some embodiments, the jack 10 includes ground engaging members 30 as discussed above. Ground engaging members 30 may comprise motorized wheels at 30 as shown in FIG. 7 connected via axles 40 to motor 45 and support arms 25. In certain embodiments, motor 45 may be controlled and powered via conduit 50 disposed within support arms 25.

Figure 9:
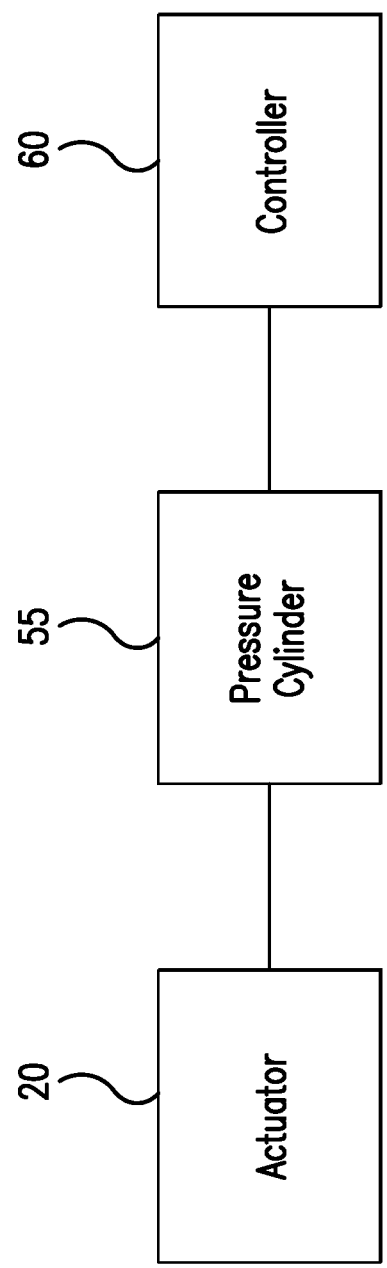
FIG. 9 is a block diagram of a control system for the jack according to an embodiment.

Referring now to FIG. 9, there is a block diagram of a control system for the jack 10 according to an embodiment. In certain embodiments, the jack 10 may include an actuator 20 configured to deploy the jack 10 from the stowed position beneath the semi-trailer 102 substantially in parallel to the ground or road to the deployed or operative position substantially perpendicular to the ground or road via the actuator 20. Jack 10 may further include a jack controller 60 electrically connected to a pressure cylinder 55 that is integrated with the arms 25 and configured to cause the arms 25 to extend and retract between the deployed and extended positions discussed above. In some embodiments, the pressure cylinder 55 may be pneumatic or hydraulic and configured to feed from or be linked to the air compression or brake system of the semi-trailer 102.

Figure 8:
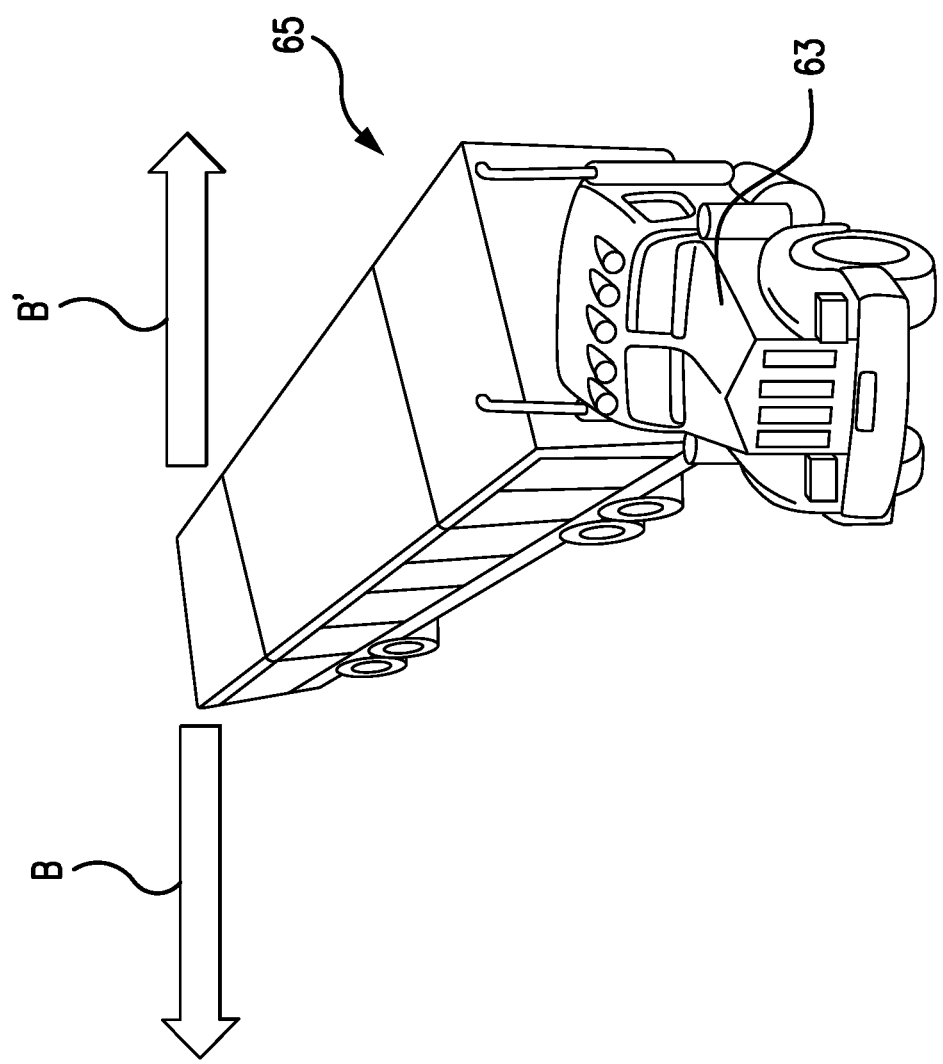
FIG. 8 is a perspective view of a tractor trailer with a laterally movable rear portion according to an embodiment of the disclosure.

Referring now to FIG. 8, there is the tractor 100 and semi-trailer 102 with a laterally movable rear portion at B, B' according to an embodiment of the disclosure. The ability to lift the rear of the semi-trailer 102, whether the rear is also configured to move or not, is advantageous in that it permits service, for example, changing tires or brake pads and other components, in the field and while the semi-trailer 102 loaded. The ability to also move the semi-trailer 102 sideways or laterally, as shown in FIG. 8 by arrows B and B', permits maneuvering the semi-trailer 102 in tight spaces where it might otherwise not be able to dock or, in most cases, be maneuvered in a fashion that induces large stresses on the frame 118 and wheel bogie 200 as well as wear on the tires 218 when the semi-trailer 102 is forced to make tight turns when being positioned at a loading dock, for example.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A semi-trailer, comprising:
an elongated trailer frame having a front portion and a rear portion;
a wheel bogie disposed beneath the elongated trailer frame, where the wheel bogie includes a plurality of wheels having corresponding axles; and
a jack disposed proximal the rear portion of the elongated trailer frame, wherein the jack includes one or more arms that are extendable and retractable relative to the elongated trailer frame towards and away a ground surface, each of the one or more arms having a ground engaging member disposed thereon, wherein extension of the one or more arms is configured to bring the ground engaging member of each of the one or more arms in contact with the ground surface to raise and lower the rear portion of the elongated trailer frame; and wherein each of the ground engaging members is configured to lift the wheel bogie and its plurality of wheels off of the road surface, thus raising the rear portion of the elongated trailer frame off the ground.

2. The semi-trailer of claim 1, wherein extension of the one or more arms is configured to lift the plurality of wheels off the ground surface and to a height, h.

3. The semi-trailer of claim 1, wherein the jack further comprises a frame connected to the corresponding axles of the plurality of wheels.

4. The semi-trailer of claim 3, wherein the jack further comprises an actuator connected between the frame and the one or more arms, the actuator operating to rotate the one or more arms to and from a vertical, deployed position and a stowed position.

5. The semi-trailer of claim 1, wherein the ground engaging members are a plurality of motorized wheels.

6. The semi-trailer of claim 5, wherein each of the plurality of motorized wheels includes a load-bearing wheel connected to an axle which is connected to a motor, the motor being electrically connected to a controller configured to direct the movement of the motorized wheels.

7. The semi-trailer of claim 5, wherein the jack including the plurality of motorized wheels is configured to cause the rear portion of the semi-trailer to move via the controller in a sideways direction with respect to the front portion of the semi-trailer when the semi-trailer is lifted by the jack.

8. The semi-trailer of claim 1, wherein the actuator is a pneumatic pivot arm in fluid communication with a pneumatic system of an air brake of the plurality of wheels.

9. The semi-trailer of claim 1, wherein the ground engaging members are configured to move the rear portion of the elongated trailer frame in a direction transverse to the elongated trailer frame.

10. A semi-trailer, comprising:
a frame having a front portion and a rear portion, the frame including a longitudinal axis, the front portion including a kingpin connection adapted for mating engagement with a socket disposed on a tractor, the rear portion including a wheel bogie having a plurality of wheels connected via respective axles;
a jack associated with the wheel bogie, the jack configured:
to raise the wheel bogie off a ground surface in an extended position to a height such that a gap is formed between the plurality of wheels and the ground surface and the jack bears a load of the semi-trailer, and
to lower the wheel bogie back down to the ground surface in a retracted position such that the plurality of wheels contacts the ground surface to bear the load of the semi-trailer;
wherein the jack further includes moveable ground engaging members configured to move the wheel bogie and the rear portion of the frame in a direction that is perpendicular to the longitudinal axis when the jack is in the extended position; and
wherein each of the ground engaging members is configured to lift the wheel bogie and its plurality of wheels off of the ground surface, thus raising the rear portion of the frame off the ground surface.

11. The semi-trailer of claim 10, further comprising an actuator associated with the jack, the actuator having a distal end and a proximal end opposite the distal end, wherein the proximal end is connected to the frame of the jack, the frame being connected to the respective axles of the wheel bogie.

12. The semi-trailer of claim 11, further comprising a plurality of pivotal support arms having a distal end and a proximal end opposite the distal end, where the proximal end is connected to the distal end of the actuator.

13. The semi-trailer of claim 12, wherein the jack further comprises a plurality of ground engaging members connected to the distal end of the plurality of support arms, wherein the ground engaging members are configured for rotational movement when the jack is in the extended position and when the ground engaging members are carrying a load of the semi-trailer on the ground surface, the rotational movement causing motion of the rear portion of the trailer.

14. The semi-trailer wheel bogie of claim 13, wherein the ground engaging members are a plurality of motorized wheels.

15. A method for operating a semi-trailer, comprising:
providing a frame having a front portion and a rear portion, the frame including a longitudinal axis, the front portion including a kingpin connection adapted for mating engagement with a socket disposed on a tractor, the rear portion including a wheel bogie having a plurality of wheels connected via respective axles;
providing a jack associated with the wheel bogie;
selectively activating the jack to move from a retracted position to an extended position to raise the wheel bogie off a ground surface to a height such that a gap is formed between the plurality of wheels and the ground surface and the jack bears a load of the semi-trailer;
selectively activating the jack to move from the extended position to the retracted position to lower the wheel bogie back down to the ground surface such that the plurality of wheels contacts the ground surface to bear the load of the semi-trailer; and
selectively activating one or more moveable ground engaging members of the jack while the jack is in the extended position to move the wheel bogie and the rear portion of the frame in a direction that is perpendicular to the longitudinal axis.

16. The method of claim 15, further comprising providing a plurality of pivotal support arms having a distal end and a proximal end opposite the distal end, where the proximal end is connected to the distal end of the actuator.

17. The method of claim 16, further comprising providing a plurality of ground engaging members connected to the distal end of the plurality of support arms, wherein the ground engaging members are configured for rotational movement when the jack is in the extended position and when the ground engaging members are carrying a load of the semi-trailer on the ground surface, the rotational movement causing motion of the rear portion of the trailer.

18. The method of claim 15, further comprising providing an actuator associated with the jack, the actuator having a distal end and a proximal end opposite the distal end, wherein the proximal end is connected to the frame of the jack, the frame being connected to the respective axles of the wheel bogie.

19. A semi-trailer, comprising:

an elongated trailer frame having a front portion and a rear portion;

a wheel bogie disposed beneath the elongated trailer frame, where the wheel bogie includes a plurality of wheels having corresponding axles; and a jack disposed proximal the rear portion of the elongated trailer frame, wherein the jack includes one or more arms that are extendable and retractable relative to the elongated trailer frame towards and away a ground surface, each of the one or more arms having a ground engaging member disposed thereon, wherein extension of the one or more arms is configured to bring the ground engaging member of each of the one or more arms in contact with the ground surface to raise and lower the rear portion of the elongated trailer frame; and wherein the ground engaging members are configured to move the rear portion of the elongated trailer frame in a direction transverse to the elongated trailer frame.

\* \* \* \* \*